(12) United States Patent
Conner et al.

(10) Patent No.: US 6,250,755 B1
(45) Date of Patent: Jun. 26, 2001

(54) ATTACHMENT OF BRIDGE AND TEMPLES TO EYEGLASS LENSES

(75) Inventors: William A. Conner; Brian N. Conner, both of San Diego; Daniel S. Kline, Encinitas, all of CA (US)

(73) Assignee: Microvision Optical, Inc., San Diego, CA (US)

( * ) Notice: Subject to any disclaimer, the term of this patent is extended or adjusted under 35 U.S.C. 154(b) by 0 days.

(21) Appl. No.: 09/411,556

(22) Filed: Oct. 1, 1999

Related U.S. Application Data

(63) Continuation-in-part of application No. 09/185,847, filed on Nov. 4, 1998, now Pat. No. 6,024,445.

(51) Int. Cl.[7] ........................................ G02C 1/04
(52) U.S. Cl. ........................ 351/110; 351/41; 351/158
(58) Field of Search ............................ 351/110, 41, 158

(56) References Cited

U.S. PATENT DOCUMENTS 5,585,870 * 12/1996 Masunaga ............................ 351/110
5,835,183 * 11/1998 Murai et al. ......................... 351/110
6,024,445 * 2/2000 Conner et al. ....................... 351/110

* cited by examiner

*Primary Examiner*—Georgia Epps
(74) *Attorney, Agent, or Firm*—Frank D. Gilliam

(57) ABSTRACT

Attachment of a bridge and temple hinge to the lens of rimless eye glasses. The attachment is accomplished by providing a tapered aperture is each lens adjacent to the outer surface of the lens and conforming the distal ends of the bridge and temple hinge to conform to the taper of the aperture. This combination provides a friction lock between the aperture and the bridge and temple hinge. The taper can be in the range of 1 to 20 degrees either convergent from the front to the back of the lens or divergent from the front to the back of the lens. Ideally a taper of 4.5 degrees is preferable. The taper can take the form of a cylinder, rectangular or triangular. The distal ends of the bridge and temple hinge can be inserted either from the front of the lens toward the back or from the back toward the front. The distal ends of the temple hinge can be inserted directly into the aperture or can be bent formed to provide a bias between the outer surface of the lens adjacent the aperture for non-rotational support. In some applications a notch is provided at the outer lens surface and the bent formed portion of the temple hinge is nested therein for additional mechanical support and to increase the resistance of relative rotation of the bridge or temple hinge.

17 Claims, 5 Drawing Sheets

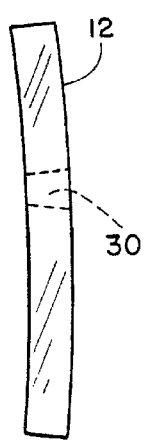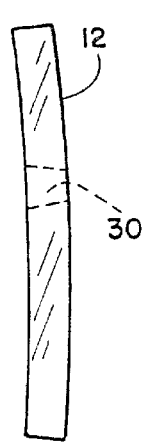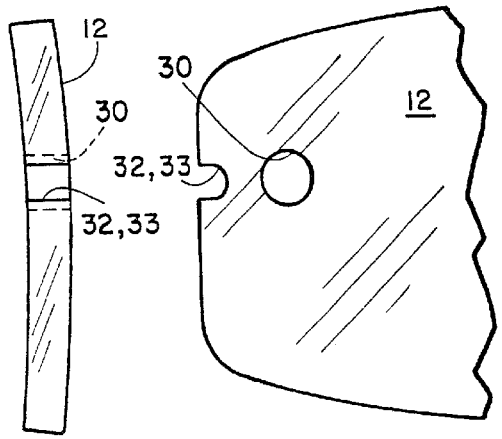
FIGURE 19  FIGURE 20  FIGURE 21  FIGURE 18
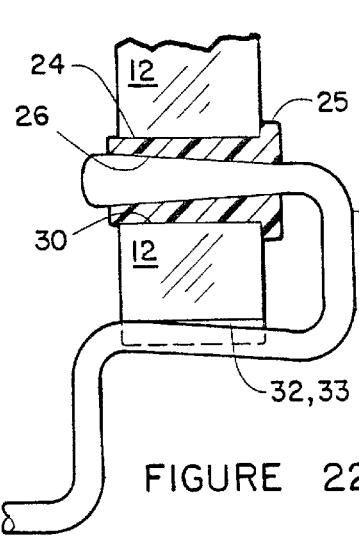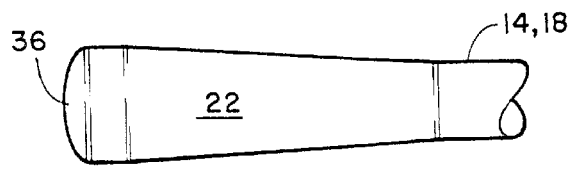
FIGURE 23
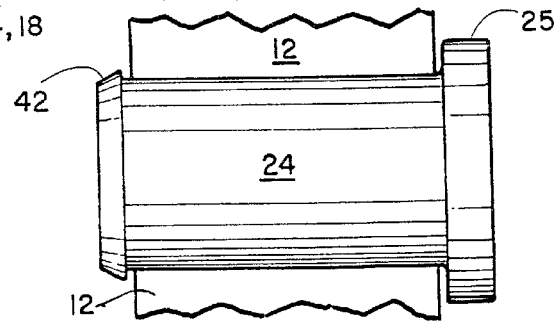
FIGURE 22
FIGURE 24
FIGURE 25
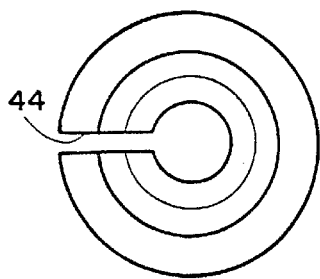
FIGURE 26

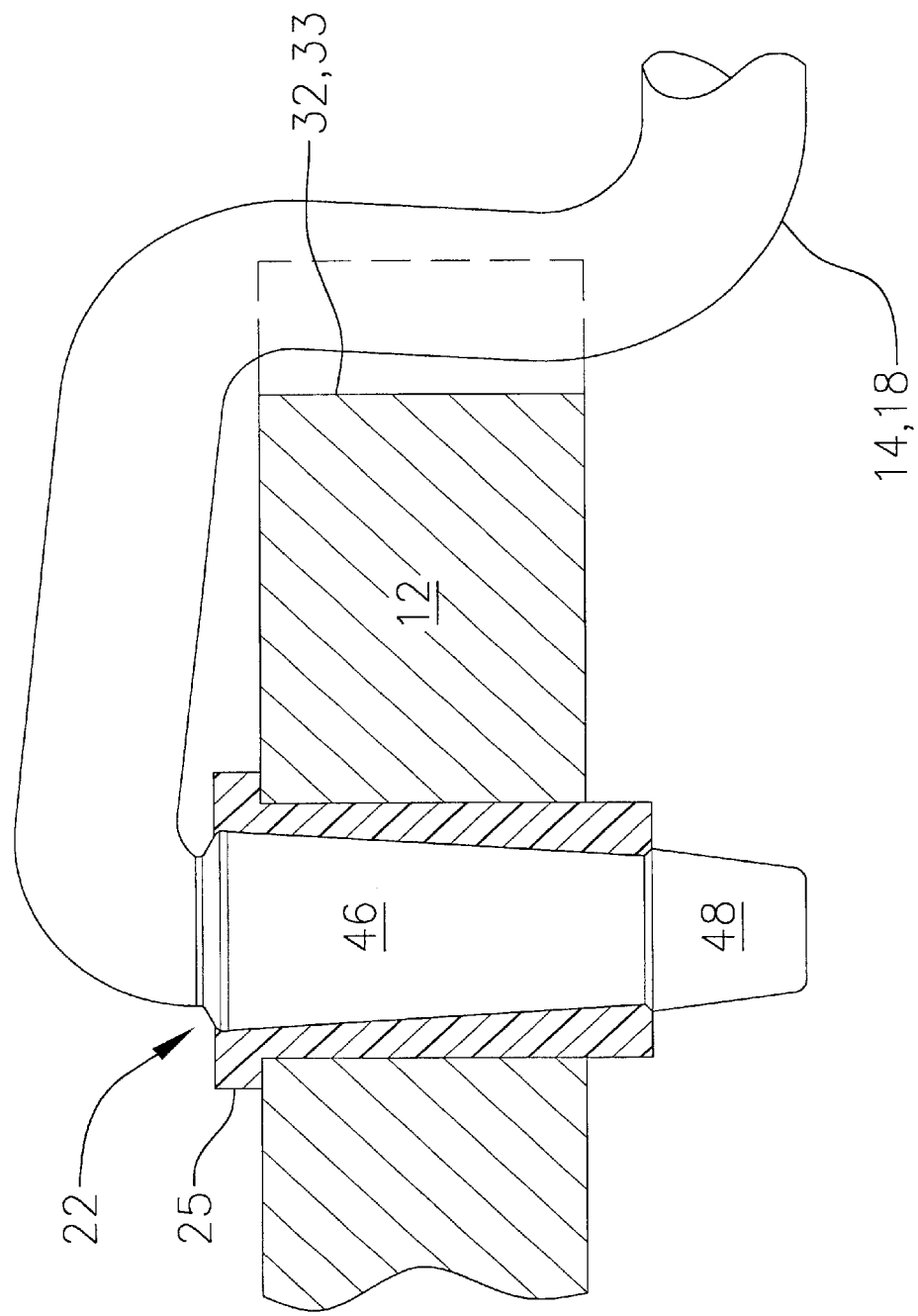

ATTACHMENT OF BRIDGE AND TEMPLES TO EYEGLASS LENSES

This application is a continuation-in-part of application Ser. No. 09/185,847 filed on Nov. 4, 1998 now U.S. Pat. No. 6,024,445.

BACKGROUND OF THE INVENTION

The invention is directed to rimless eye glasses and more specifically to means for fixedly attaching temples and bridges directly to the lens of the eye glasses.

U.S. Pat. No. 4,550,898 issued to Hafner teaches the use of clamps and screws to attached the bridge and temple hinges to the lens of rimless eye glasses.

U.S. Pat. No. 5,073,020 issued to Lindberg et al. teaches elongated slits for attaching the bridge and temple's hinges by a "U" shaped bent wire loop portions having a resilient expansion force (tension) on the outside surfaces of the "U" shaped loop for maintaining the loops and associated bridge or temple hinge connection to the lens. There is a disadvantage to this type of connections in that it can be easily disengaged from the lens as there is no locking mechanism to prevent up and down motion on the bridge and temples from loosening or disengaging the wire to lens connection.

U.S. Pat. No. 5,450,141 issued to Kobayashi teaches temple hinge and nose piece attachment to rimless glasses by means of bolts passing through the lens and nuts holding them in place.

U.S. Pat. No. 5,585,870 issued to Masunaga teaches bridge and temple hinge connections to the lens of rimless eye glasses by a round wire formed bridge and temple hinge connected at three points on the lens of rimless glasses. The connections for bridge and temple teaches a hinge are made with a "U" shaped wire biased against the lens edge by tension provided by the distal end of the wire inserted into an aperture in the lens. The distal ends of the inserted wires have a polycarbonate buffer sleeve for preventing slackness between the lens aperture and the bridge and temple hinge ends. Even with the improvement of the sleeve over the distal end of the inserted wire, there is a tendency for the wire to loosen and become dislodged from the lens and render the eye glasses useless for the purpose intended. The ends of the bridge and temple hinge are bent against the edge of the lens. The bridge and temple hinge are held in place by the bent wire forming pressure between the lens aperture and the lens edge. This connection applies a greater stress in the lens material. This reference teaches a cylindrical sleeve and a cylindrical lens aperture and does not specify an interference fit between the wire, sleeve and lens. The only force preventing the wire from becoming disloged from the lens is the relative minimal friction force deloped by the bending stress in the wire.

U.S. Pat. No. 5,646,706 issued to Izumitani teaches rimless eye glasses with apertures through the narrow vertically sides of the lens and with protrusions extending from the bridge and temple inserted into the apertures and adhered thereto by adhesive means.

U.S. Pat. No. 5,748,280 issued to Herman teaches a plurality of apertures through the lens of rimless glasses. Separate pairs of apertures are used to attach the temple and two pairs of apertures are used to attach the bridges.

There is a continuing need to improve the bridge and temple hinge attachment to the lens of rimless eye glasses to provide a more secure joint between the components, minimize the weight of the eyeglasses, and to minimize the required structure fir styling reasons. The preferred embodiments of the instant invention proved an advancement in this art.

SUMMARY OF THE INVENTION

The invention is directed to rimless eye glasses, and more specifically to the connection of bridges and temple hinges to rimless eye glasses. This invention teaches and claims the temple hinge and the bridge being directly attached within an aperture through the lens and in one embodiment the bridge and temple hinge are additionally supported by a notch in both sides of each lens to further discourage rotation of the temple hinge or bridge about the single attachment point.

The distal tip of the temple hinge and bridge and the apertures in the eye glass lens can take many different mating forms including fustro conic, rectangular and triangular.

In a preferred embodiment, a spacer or shim of deformable resilient material having an outer cylindrical shape substantially the same diameter as the cylindrical apertures through the lens and an inner frusto conic bore is positioned between the lens apertures and the distal ends of the bridge and temple hinge. The aperture through the shim or spacer is shaped to conform to the tapered shape of the distal tip of the bridge and the lens aperture, i.e., the aperture through the bushing is either frusto conic, rectangular or triangular to conform with a like configuration of the distal ends of the bridge and temple.

In another embodiment the bushing is split to accommodate the insertion of the distal tip of the bridge or temple hinge into the lens aperture. In this embodiment the bushing stays attached to the distal end of the bridge and temple hinge when removed therefrom.

The bridge and temple hinge can be attached to the lens through either surface of the lens, i.e., front or back surfaces, and can be a single aperture connection or can be formed to provide a biasing force between an aperture and the outer edge of the lens surface.

In another embodiment the side support includes a notch that resists rotation of the bridge or temple hinges when inserted within the lens aperture.

The invention as disclosed in this application provides an improvement to rimless eye glasses by providing a more positive and secure connection between the lens and bridge and temple hinge and reduces the over all weight of the eye glasses.

The principal object of this invention is to provide a light weight and more cosmetically appealing pair of rimless eye glasses.

Another object of this invention is to provide a single connection positive lock connection between the eye glass lens and attached bridge or nosepiece and temple hinge.

The above and other objects, features and advantages of the present invention will become apparent from the following descriptions when taken in conjunction with the accompanying drawings that illustrate preferred embodiments of the present invention by way of example.

BRIEF DESCRIPTION OF THE DRAWING FIGURES

FIG. 18 is a partial showing of an eye glass lens showing the relative positions of the aperture and notch;

FIGS. 19–21 depicts cutaway side views of a first, second and third apertures through lens configurations;

FIG. 22 is a cutaway side showing of a third embodiment of bridge and temple hinge to lens attachment;

FIG. 23 is a side detail showing of the distal end or tip of the bridge and temple hinge as shown in FIGS. 11 and 21;

FIG. 24 is a third embodiment of the bushing;

FIG. 25 is a cutaway showing of a fourth embodiment of the bushing;

FIG. 26 is an end view taken along line 26—26 of FIG. 2;

FIG. 28 depicts a distal end of the temple hinge having an enlarged conical end protrusion there around.

DETAILED DESCRIPTION OF THE PREFERRED EMBODIMENTS

Figure 1:
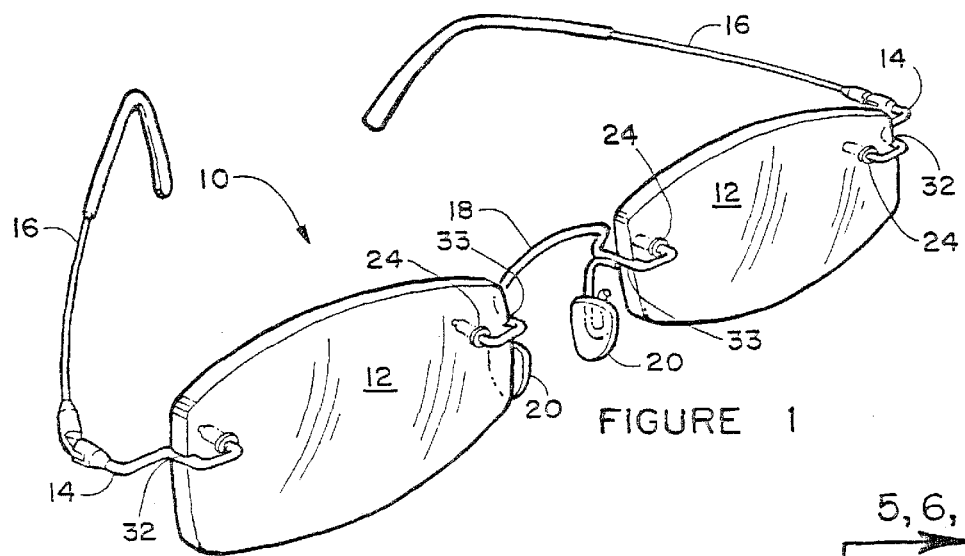
FIG. 1 is a perspective showing of a first embodiment of the invention employed on conventional rimless eye glasses with bridge and temple hinge attached through the inner surface of the eye glass lens.

Referring now to drawing FIGS. 1–7,FIG. 1 depicts a perspective showing of one embodiment of the invention in combination with a pair of rimless eye glasses 10. The eye glasses include lens 12 having a front surface toward the right-hand side of the drawing Figures and the back of the lens is at the left of the drawing figures, temple hinges 14, temples 16, bridge 18 and nose pieces 20. The bridge, temple hinge and temple may be constructed of any suitable material either plastic or metal with beta titanium being preferable. The nose pieces can be constructed of any suitable material with a soft pliable material being preferable.

Figure 2:
FIG. 2 is a side cutaway view showing a first embodiment of a distal or tip lens aperture insertion/attachment end of the noise piece and temple hinge.

Referring now specifically to drawing FIG. 2, this Figure represents a side view if the distal end or tip 22 of both the bridge 18 and temple hinge 14. The distal end or tip 22 is either formed on the distal ends of the bridge and temple hinge or separately formed and slipped over the distal end or tip end of the material forming the bridge 18 and temple hinge 14 and is fixedly attached thereto by any suitable method such as, but not limited to, soldering, welding adhering or the like.

Figure 4:
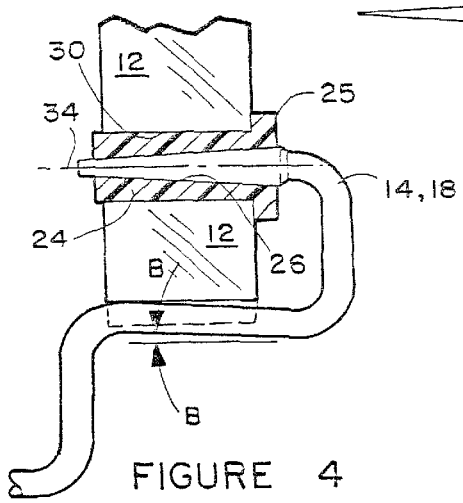
FIG. 4 is a side cutaway showing of the distal end or tip of the temple hinge and bushing of FIGS. 2 and 3 inserted into a lens aperture for securement thereto.
Figure 3:
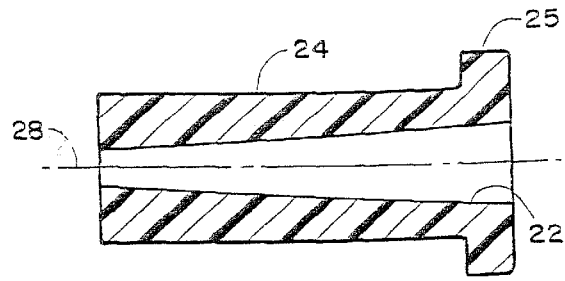
FIG. 3 is a side cutaway view showing of a first embodiment of a bushing of the invention for placement between a bridge and temple hinge lens aperture and the distal or tip insertion end of the noise piece and temple hinge for attachment to the lens.
Figure 5:
FIGS. 5–7 depicts various cross sectional configurations of the distal or tip of the bridge and temple hinge attachment to the lens.
Figure 6:
Figure 7:

The cross-section of the distal end or tip of the bridge and temple hinge may divergent or convergent and take a number of different configurations such as those shown in drawing FIGS. 5–7. As shown in the drawing FIG. 2 configuration that can be any one of the configurations shown in drawing FIGS. 5–7, the taper angle "A" of either converging or diverging toward the tip may vary in a range of slope angles from 1 degree to 45 degrees along the length of the tip 22. Drawing FIG. 3 depicts a cutaway side view showing of a first embodiment of a bushing 24 with a channel 26 through the center axes 28 and a flange or protrusion 25. The channel 26 may be configured substantially the same as the tip 22 or either one may have different convergent or divergent slope angle "A" then the other. The bushing 24 can be constructed of any material suitable for the purpose intended. Like the nose pieces 20, the bushing can be constructed of a form able material such as, by way of example and not intended as a limitation thereto, plastic, natural rubber, gum rubber, synthetic elastomer or the like suitable for the purpose intended. Referring again to drawing FIG. 4, there is depicted a partial side cutaway showing of the tip 22 and bushing 24 inserted into the apertures 30 and 31 through the front of lens 12 with the flange or protrusion 25 positioned against the lens surface. The cross-section of the apertures through the lens 12 in this embodiment may take any one of the various shapes shown in drawing FIGS. 5–7, as fore mentioned, and the cross sectional shape as the channel 26 through the bushing and configuration of the tip 22 may be alike or have relative different convergent or divergent slope angles. Again referring to drawing FIG. 4, the slots 32 and 33 at each edge of each lens receive a portion of the bridge or temple hinge therein. The center line 34 of the tip 22 is not parallel with the portion of the temple hinge engaging the slot 32 and similarly the nose piece between nose piece 18 and slot 33 have the same configuration as between 34 and the portion of 14 within the slot 32. The temple hinge portion engaging the slot is formed inward toward the center line 34 if the tip 22 forming an angle "B". This angle at "B" acts to clamp the temple hinge or bridge to the lens by biasing the tip 22 toward the temple portion in the slot. The clamping force increases the force that holds the joint between the bridge or temple hinge and the lens together and prevents rotation of the temple or bridge about axis 34 which could cause the joint to loosen.

Figure 8:
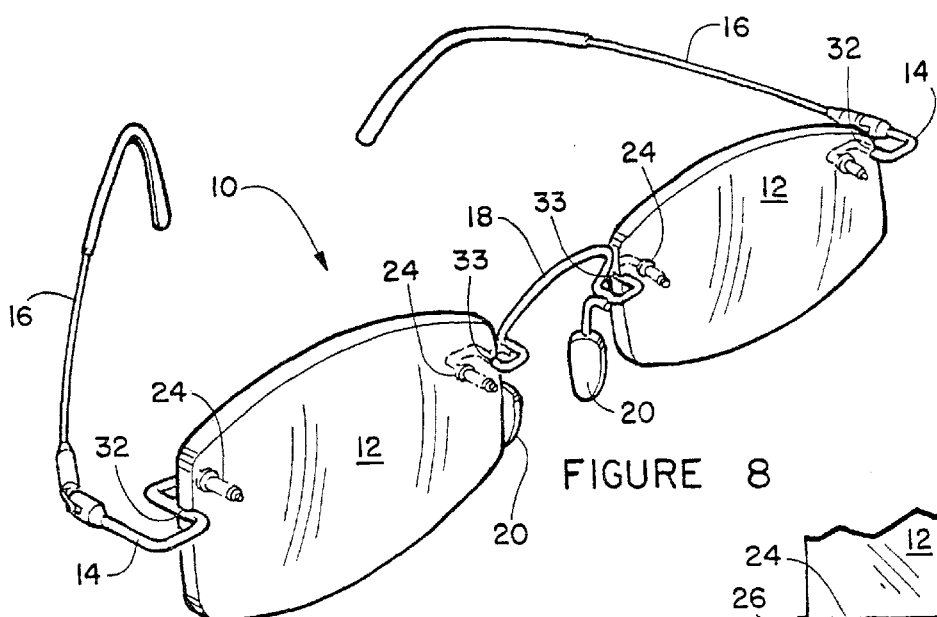
FIG. 8 is a perspective showing of a second embodiment of the invention employed on conventional rimless eye glasses with bridge and temple hinge attached through the outer surface of the eye glass lens.

Referring now specifically to drawing FIG. 8, the showing in this Figure is similar to the showing and discussion of drawing FIG. 1 above except that the distal ends of the bridge and temple hinges are inserted into the aperture 30 from the rear of the lens toward the front of the lens rather than from the front of the lens toward the rear of the lens. The insertion from the rear of the lens toward the front of the lens requires an "S" form at the distal end of the temple hinge rather than a "U" form at the distal end shown in drawing FIG. 1.

Figure 9:
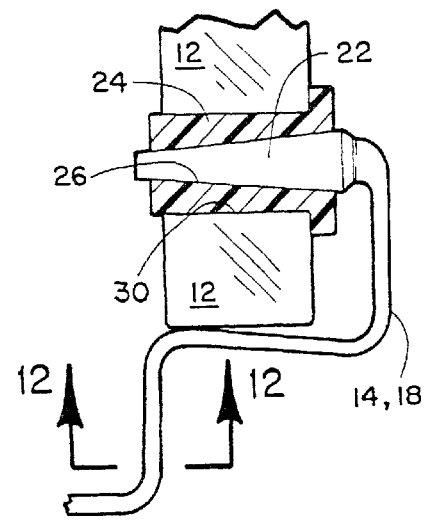
FIG. 9 is a cutaway side view showing similar to the showing of FIG. 4 as related to the outer attachment of the bridge and temple hinge of FIG. 8.

Referring now specifically to drawing FIG. 9, this Figure depicts a cross-sectional detail of the bridge and temple hinge attachment to the lens as depicted in drawing FIG. 4 except that there is no notch at the outer lens surface and the bridge and temple hinge are biased between the outer lens surface and the aperture 30. The bias is provided in the same manner as previously discussed above in the description of drawing FIG. 4.

Figure 10:
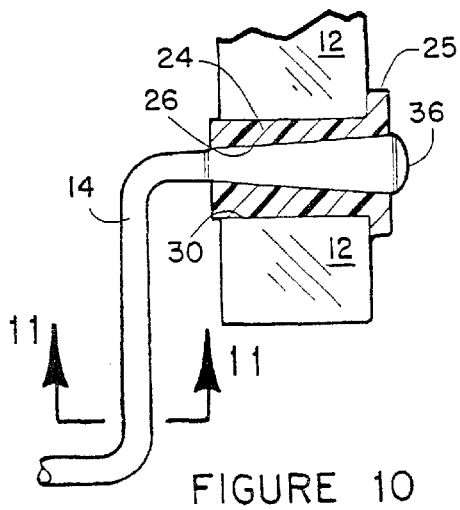
FIG. 10 is a second embodiment similar to the FIG. 4 showing with the bridge and temple hinge distal end or tip inserted into a lens aperture from the back of the lens with the bushing inserted from the front of the lens.

Referring specifically to drawing FIG. 10, this figure is similar to drawing FIG. 9 except that the distal end of the bridge 18 and temple hinge 14 is attached to the aperture through the lens only and have no bias support at the lens edge. Also, the distal ends of the bridge and temple hinges are tapered divergently toward the front of the lens 12 rather than convergently toward the front of the lens with the bushing 24 inserted from the front of the lens and has a curvilinear end surface 36.

Figure 11:
FIG. 11 is a showing taken along line 11—11 of FIG. 10.

FIG. 11 depicts the cross-sectional configuration of the bridge and temple hinge cross-section at line 11—11 of FIG. 10.

Figure 12:
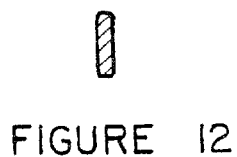
FIG. 12 is a showing taken along line 12—12 of FIG. 9.

FIG. 12 depicts the cross-sectional configuration of the bridge and temple hinge cross-section at line 12—12 of FIG. 9.

Figure 13:
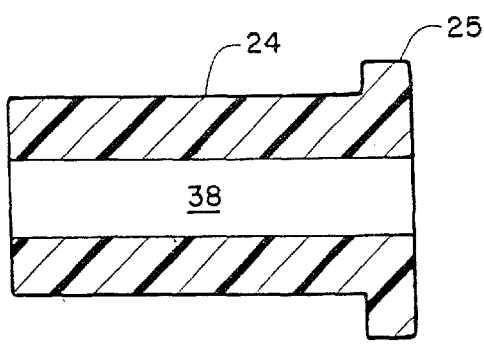
FIG. 13 is a second embodiment of the bushing.

FIG. 13 is a second embodiment of the bushing 24 having a non tapered aperture 38 through the longitudinal center line.

Figure 14:
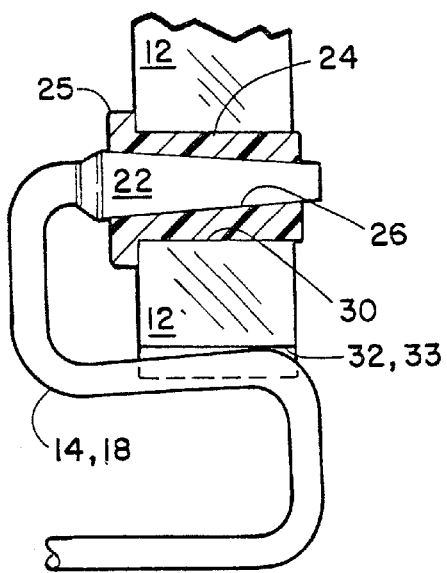
FIG. 14 is a detailed cutaway detail of the bridge and temple hinge attachment of FIG. 8.

FIG. 14 is a cutaway cross sectional detail showing of the bridge 18 and temple hinge 14 to lens connection for FIG. 8.

Figure 15:
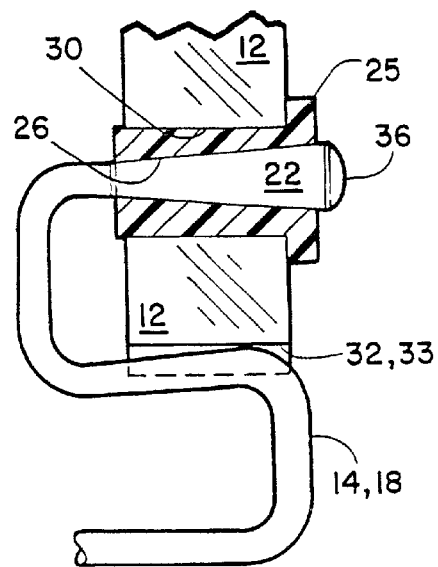
FIG. 15 is a cutaway showing similar to FIG. 10 with an "S" bend in the temple hinge attachment to provide additional lens side notch support.

FIG. 15 is a showing of a back lens 12 connection with the "S" configured bends in the distal ends of the bridge 18 and the temple hinge connected to the lens in the same manner as that shown in drawing FIG. 10.

Figure 16:
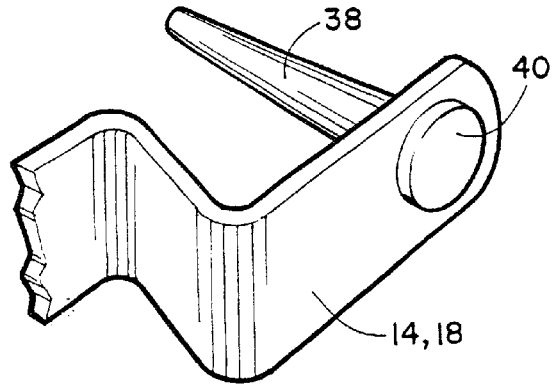
FIG. 16 is a perspective showing of a second embodiment of a bridge and temple hinge to lens attachment.

FIG. 16 is a perspective showing of the distal ends of the bridge and temple hinge formed from flat material with a distal end or tip 38 swedged or otherwise fixedly attached to the distal end of the bridge and temple hinge through in an aperture 40.

Figure 17:
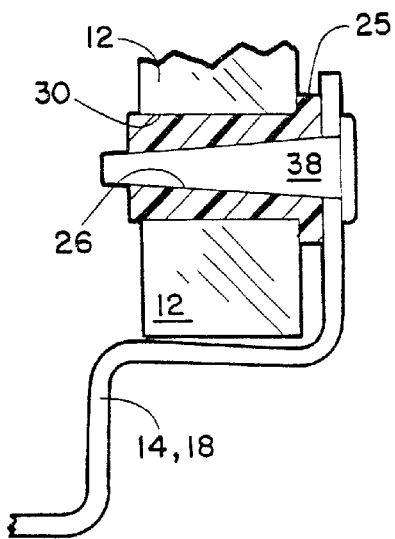
FIG. 17 is a cutaway showing similar to FIG. 15 except the bridge and temple hinge and bushing are mounted through the front of the lens.

FIG. 17 is similar to the FIG. 16 showing with the connections installed through the front of a lens 12 in a aperture 26 of bushing 24 as herein before discussed.

FIG. 18 is a section of a lens 12 showing the position relationship of notch 32, notch 33 (not shown in this Figure) being on the opposite side of the lens and the aperture 30.

FIGS. 19–21 depicts different configured apertures 30 through the lens 12, FIG. 19 depicts an aperture converging from the front surface toward the rear surface of the lens 12. FIG. 20 depicts an aperture diverging from the front surface toward the rear surface of the lens 12. FIG. 21 depicts an aperture that is the same cross-sectional configuration from the front surface toward the rear surface of the lens 12.

FIG. 22 depicts a cross-sectional showing of a second embodiment of a lens front inserted bridge and temple hinge connection with the aperture 30 and the distal ends or tips being divergent from the front toward the rear surface of the lens 12.

FIG. 23 depicts a detail showing of the bridge and temple hinge distal ends or tips as shown in drawing FIGS. 10 and 22.

FIG. 24 depicts a third embodiment of the bushing 24 having a locking flange 42 that when installed within aperture 30 of the lens is locked into the lens between protrusion 25 and flange 42. This bushing 24 can have any configured mating aperture 26 therethrough.

FIG. 25 depicts a fourth embodiment of the bushing 24 having a divergent aperture 31 therethrough from the protrusion 25 toward the flange 42. A slit 44 along the sleeve allows for expansion when inserted and compressing when removed.

FIG. 26 is an end view showing taken along line 26—26 showing the slit 44; and

Figure 27:
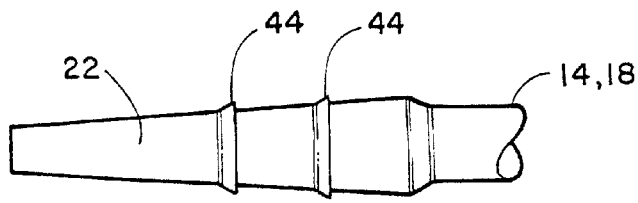
FIG. 27 is a side detail showing of the distal end or tip of the bridge and temple hinge having locking ribs.

FIG. 27 shows a bridge or temple hinge tip 22 that includes a plurality of locking ribs 44 that have an angled slope on one surface and a right angle surface opposite thereto for allowing easily insertion into the bushing 24 when inserted angled slope surface first and resistive to removal after inserted. The ribs also provide some expansion force between the end 22, bushing 24 and aperture 30 increasing locking forces therebetween.

Referring now to drawing FIG. 28, the distal end of the temple hinge and the ends of the bridge not shown (being identical with the distal end of the temple hinge) have a tapered end with a first taper and an enlarged second taper at the distal end thereof. As shown in the drawing FIG. 28 the temple hinge distal end (as does the distal ends of the bridge) has a first taper 46 extending from the temple hinge 14–18 and a second taper 48 at the distal tip. The second taper 48 provides for ease of insertion into the tapered bushing 22 and resists removal of the temple distal ends and the bridge distal ends from the lens 12 when inserted within the lens aperture 30 through the lens. The distal end taper 48 may extend through the lens as shown or may terminate within the lens or external of the lens surface. In the configuration shown in FIG. 28, the second taper 48 does not completely emerge from the bushing 24. Bushing 24 does emerge from lens 12, hence taper 48 will cause bushing 24 to flare out or increase in diameter beyond lens 12. Further increasing the joint security. It should be noted that the temple hinge need not bear against the outer lens surface to maintain the distal ends of the temple hinge within the lens aperture 30. The notch 32–33 in the outer lens surface shown provides rotational stability to the temple hinge.

In the instant invention, as contrasted with the prior art, teaches and claims that a change in shape between a cylinder and a tapered cylinder produces a fundamental change in the behavior of the system. First, assume that it is desired to press a generally cylindrical temple end with a cylindrical sleeve there over into a cylindrical hole of a slightly smaller diameter so as to produce a secure joint. Furthermore, assume that, due to manufacturing tolerances, the diameter of the distal end of the temple hinge and aperture through the lens will vary in diameter. It follows that if both the frictional holding force required in that joint and the force required to insert the member into the hole will vary widely according to diameter tolerance variations. In contrast, a tapered member described herein inserted into a tapered hole with a known force always produces a consistent holding force regardless of the variations in tolerance of the distal end of the temple hinge or an aperture through the lens. This feature is a great practical benefit to both the manufacturing and assembly process, and in fact proves to be elemental to insuring that the stress in the glass or plastic lens does not rise to a level that produces a failure in the lens material.

It should be understood that although the explanation of the invention has been directed to rimless eye glasses it should be understood that the invention can be employed in rimed eye glasses where either the bridge or temple hinge is attached directly to the lens rather than the rim.

The foregoing is considered as illustrative only of the principles of the present invention. Further, since numerous modifications and changes will readily occur to those skilled in the art, it is not intended to limit the invention to the exact construction and applications shown and described, and accordingly, all suitable modifications and equivalents may be regarded as falling within the scope of the invention in the appended claims and their equivalent.

We claim:

1. An improved attachment means for attaching the temple hinges and bridge directly to the lens of rimless eye glasses comprising:

an aperture through each of said lenses;

a bushing formed resilient material for insertion into each of said apertures, said bushing having a cylindrical aperture therethrough;

said bridge and temple hinge generally tapered smaller in size toward the distal end for frictional attachment within said aperture and the tip of said distal end of said bridge and zzztemple hinge comprises a substantially conic protrusion, said protrusion being greater in diameter than the bridge and temple hinge surface adjacent thereto and said aperture through said bushing, when said distal ends of said bridge and temple hinges are seated in their respective bushing apertures they are locked therein by the friction of the distal end of the temple hinge against the bushing wall.

2. The invention as defined in claim 1 wherein said bridge and said temple hinges adjacent their distal ends are bent formed so that they bear against the outer surface of said lens when said distal ends thereof are inserted into said tapered apertures placing a biasing tension therebetween.

3. The invention as defined in claim 2 additionally comprising a notch in the outer surface of said lens wherein said bent formed distal ends are received within said notch when the distal ends are inserted within said aperture.

4. The invention as defined in claim 1 herein said bushing has a longitudinal split through a side surface.

5. The invention as defined in claim 1 wherein the degree of taper between said ends is selected from a taper range from 1 to 20 degrees of taper.

6. The invention as defined in claim 1 wherein when said distal ends are inserted into the front surface of said lens the adjacent bridge and temple hinge structure are bent formed into a "S" configuration with a portion of the bent form structure biased against the outer surface of said lens.

7. The invention as defined in claim 6 further comprising a notch in each side of said lens wherein said bent form structure biased against the outer surface of said lens is captive therein.

8. The invention as defined in claim 1 wherein when said distal ends are inserted into the back surface of said lens the adjacent bridge and temple hinge structure are bent formed into a "C" configuration with a portion of the bent form structure biased against the outer surface of said lens.

9. The invention as defined in claim 1 wherein when said distal ends are inserted into the front surface of said lens the adjacent bridge and temple hinge structure are bent formed into a "S" configuration with a portion of the bent form structure biased against the outer surface of said lens.

10. The invention as defined in claim 1 further comprising a notch in each side of said lens wherein said bent form structure biased against the outer surface of said lens is captive therein.

11. The invention as defined in claim 10 further comprising a notch in each side of said lens wherein said bent form structure biased against the outer surface of said lens is captive therein.

12. The invention as defined in claim 1 wherein said distal ends further comprises a plurality of locking ribs around the circumference of the distal ends of the bridge and temple hinges.

13. The invention as defined in claim 12 wherein said locking ribs have a smooth tapered surface and a right angled surface adjacent thereto relative to the longitudinal center line of said distal end with the small end of said smooth tapered surface being directed toward the small end of the bridge and temple hinge taper.

14. The invention as defined in claim 13 wherein said locking ribs have a smooth tapered surface and a right angled surface adjacent thereto relative to the longitudinal center line through said distal end with the small end of said smooth tapered surface being directed toward the large end of the bridge and temple hinge taper.

15. The invention as defined in claim 1 wherein said enlarged lip extends beyond the length of the aperture locking said lip against the adjacent outer surface of said lens.

16. The invention as defined in claim 1 wherein said bushing extends beyond the length of the aperture.

17. The invention as defined in claim 1 wherein said enlarged lip extends beyond said bushing.

* * * * *